United States Patent

Baca et al.

[19]

[11] Patent Number: 6,085,123
[45] Date of Patent: Jul. 4, 2000

[54] PASS THROUGH AND LOAD/UNLOAD FOR AUTOMATED DATA STORAGE LIBRARIES

[75] Inventors: Francisco Antonio Baca; Robert Lamar Bingham; Jerry Walter Hammar, all of Tucson, Ariz.

[73] Assignee: International Business Machines Corporation, Armonk, N.Y.

[21] Appl. No.: 09/052,965

[22] Filed: Apr. 1, 1998

[51] Int. Cl.[7] ................................................ G06F 19/00
[52] U.S. Cl. ........................................ 700/214; 700/245
[58] Field of Search .................................. 700/213, 214, 700/217, 220, 245; 369/34, 36

[56] References Cited

U.S. PATENT DOCUMENTS

| | | | |
|---|---|---|---|
| 5,236,296 | 8/1993 | Ostwald | 414/280 |
| 5,395,199 | 3/1995 | Day, III | 414/267 |
| 5,479,581 | 12/1995 | Kleinschnitz | 395/82 |
| 5,485,436 | 1/1996 | Forget et al. | 369/36 |
| 5,508,859 | 4/1996 | Hu et al. | 360/92 |
| 5,546,315 | 8/1996 | Kleinschnitz | 364/478.06 |
| 5,646,918 | 7/1997 | Dimitri et al. | 369/34 |
| 5,663,938 | 9/1997 | Dang et al. | 369/36 |
| 5,740,061 | 4/1998 | Dewey | 364/478.02 |
| 5,911,148 | 6/1999 | Anglin et al. | 711/111 |
| 5,956,301 | 9/1999 | Dimitri et al. | 369/34 |
| 5,999,356 | 12/1999 | Dimitri et al. | 360/71 |
| 6,005,745 | 12/1999 | Filkins et al. | 360/92 |
| 6,008,964 | 12/1999 | Goodknight et al. | 360/92 |

FOREIGN PATENT DOCUMENTS

| | | | |
|---|---|---|---|
| 56-080847 | 7/1981 | Japan | G11B 15/68 |
| 4-157664 | 5/1992 | Japan | G11B 17/26 |

*Primary Examiner*—Joseph E. Palys
*Assistant Examiner*—Ronald D Hartman, Jr.
*Attorney, Agent, or Firm*—John H. Holcombe; Robert M. Sullivan

[57] ABSTRACT

Disclosed is a combined pass through and load/unload system for automated data storage libraries. Separate portals open into each of the libraries. A pivoting robot supports a housing which is capable of supporting at least one removable multi-cartridge magazine, and pivots about a pivot axis. An actuator withdraws or extends the housing toward or away from the pivot axis. A pass through controller operates the pivoting robot to position the housing at a portal and operates the actuator to extend the housing into the portal so that the library may load and/or unload the data storage media into or out of the removable magazine(s) in the housing. The controller then operates the actuator and robot to withdraw the housing out of the portal. The controller may position the housing at the bulk load/unload position so an operator may unload and/or load magazines from the housing. The controller may position the housing at the portal of the other library to allow the transfer of media thereto. Each library may have a pass through controller and the other library may position and extend the housing into its portal, whereby the picker of the other library may unload the data storage media.

11 Claims, 4 Drawing Sheets

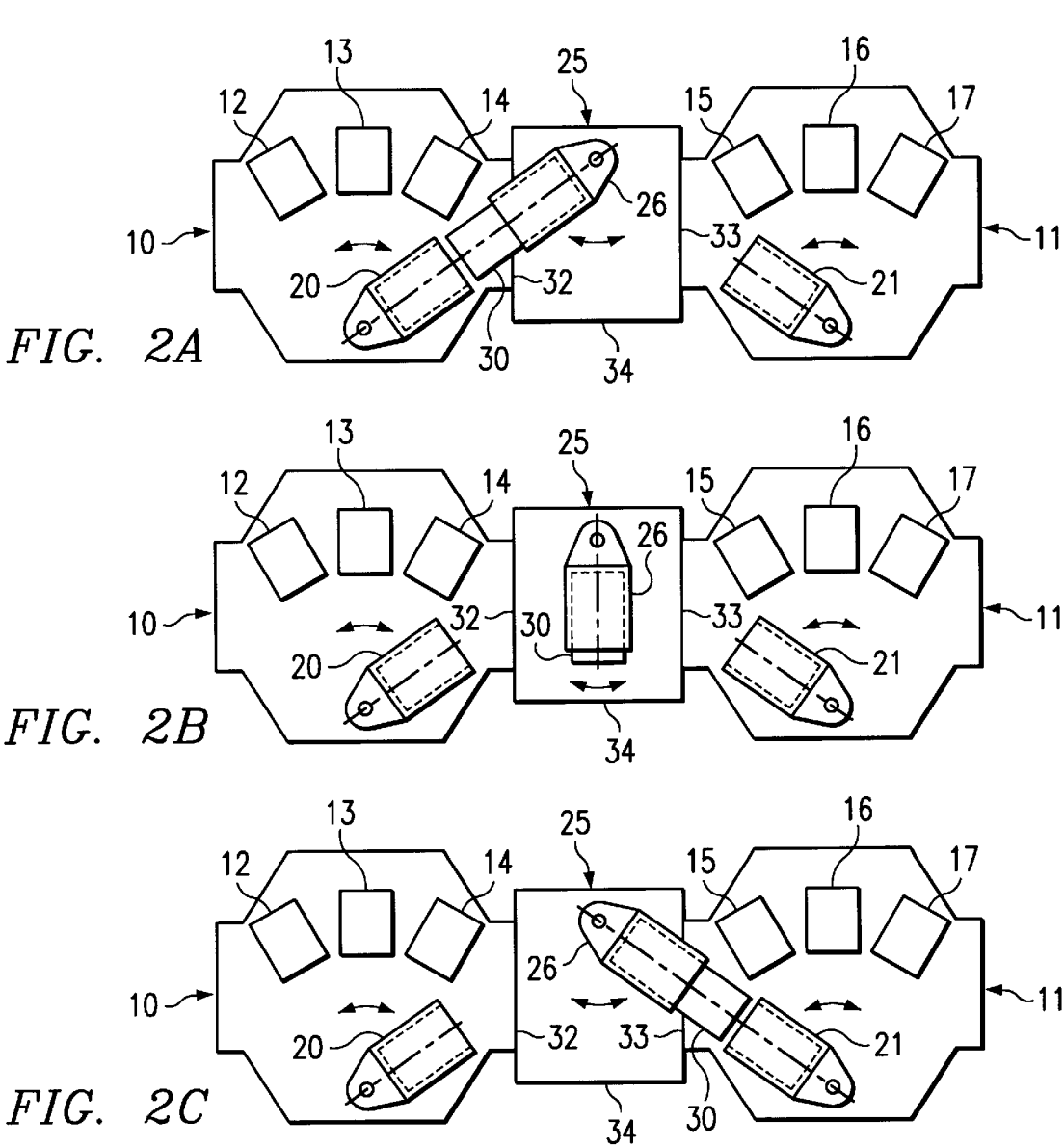

PASS THROUGH AND LOAD/UNLOAD FOR AUTOMATED DATA STORAGE LIBRARIES

TECHNICAL FIELD

This invention relates to automated data storage libraries for storing media in a plurality of storage slots, and, more particularly, to the passing of data storage media from one automated data storage library to another automated data storage library and the load/unload of data storage media into or out of automated data storage libraries.

BACKGROUND OF THE INVENTION

Larger data processing systems typically include a plurality of host processors and typically require storage for large numbers of data storage media. The data storage media are typically optical disks or magnetic tapes which are stored in a library having a plurality of storage slots, and which can be accessed by a picker. The storage slots are typically arranged in rows, and the rows are arranged in columns. The picker is typically a robotic device which moves along a guideway in an X-Y, or rotary motion to access the various storage slots.

Often, one such library has insufficient storage capacity, and simply adding capacity would make the library response too slow. Therefore, another library may be added to the system. The load balancing between libraries is difficult, and, in many instances, it is desirable to move many of the data storage media from one of the libraries to the other so that the workload may be balanced. The problem becomes more pronounced when still more libraries are in the system.

Conventional pass through systems for automated libraries typically require the libraries to be specially designed to have a common wall and allow for the insertion of a small number of data storage media into slots in the common wall by one library while the other library accesses the data storage media from the slots in the common wall.

Additionally, it may be desirable to load or to unload large quantities of data storage media into or out of a library.

Conventional input/output slots are separate from any pass through slots and provide an access to the library which may pivot or slide between an interior position accessible by the library picker and an exterior position accessible by an operator. The conventional input/output slots tend to allow loading and unloading of only small quantities of data storage media.

SUMMARY OF THE INVENTION

Disclosed is a combined pass through and load/unload system for automated data storage libraries, which libraries are not specially designed to have a common wall.

A first portal opens into a first one of the libraries. A second portal opens into a second one of the libraries. A housing is provided which is capable of supporting at least one removable magazine, the removable magazine for holding a plurality of the data storage media. A pivoting robot supports the housing, and rotates about a pivot axis between a first position directed at the first portal, a second position directed at the second portal, and a bulk load/unload position between the first and the second positions. An actuator withdraws the housing toward the pivot axis and extends the housing away from the pivot axis. Upon receiving a "library load/unload" command for one of the libraries, a pass through controller operates the pivoting robot to position the housing at the portal of the one library and operates the actuator to extend the housing away from the pivot axis into the portal for the library, whereby the picker of the one library may load and/or unload the data storage media into or out of the removable magazine(s) in the housing. Upon the one library providing a "library load/unload completed" command, the pass through controller operates the actuator to withdraw the housing out of the portal toward the pivot axis. The pass through controller may operate the pivoting robot to position the housing at the bulk load/unload position, and an operator may unload and/or load magazines from the housing at the bulk load/unload position, with their associated data storage media. The pass through controller may instead operate the pivoting robot to position the housing at the portal of the other library and extend the housing into the other library. Thus, the other library may unload the data storage media to transfer the data storage media thereto. Alternatively, each library may have a pass through controller, and the other library may take control and its pass through controller may operate the pivoting robot to position the housing at the portal of the other library and operate the actuator to extend the housing away from the pivot axis into the portal of the other library, whereby the picker of the other library may unload the data storage media of the removable magazine(s) in the housing.

An advantage of the present invention is that the libraries do not have to be redesigned and modified to have a common wall for pass through, and they do not have to modified to provide a separate bulk load/unload facility.

For a fuller understanding of the present invention, reference should be made to the following detailed description taken in conjunction with the accompanying drawings.

BRIEF DESCRIPTION OF THE DRAWINGS

FIG. 1 is a diagrammatic front view representation of two automatic data storage libraries and a pass through and load/unload system in accordance with the present invention;

FIGS. 2A, 2B and 2C are diagrammatic representations of the operation of the system of FIG. 1;

DETAILED DESCRIPTION OF THE INVENTION

Figure 3:
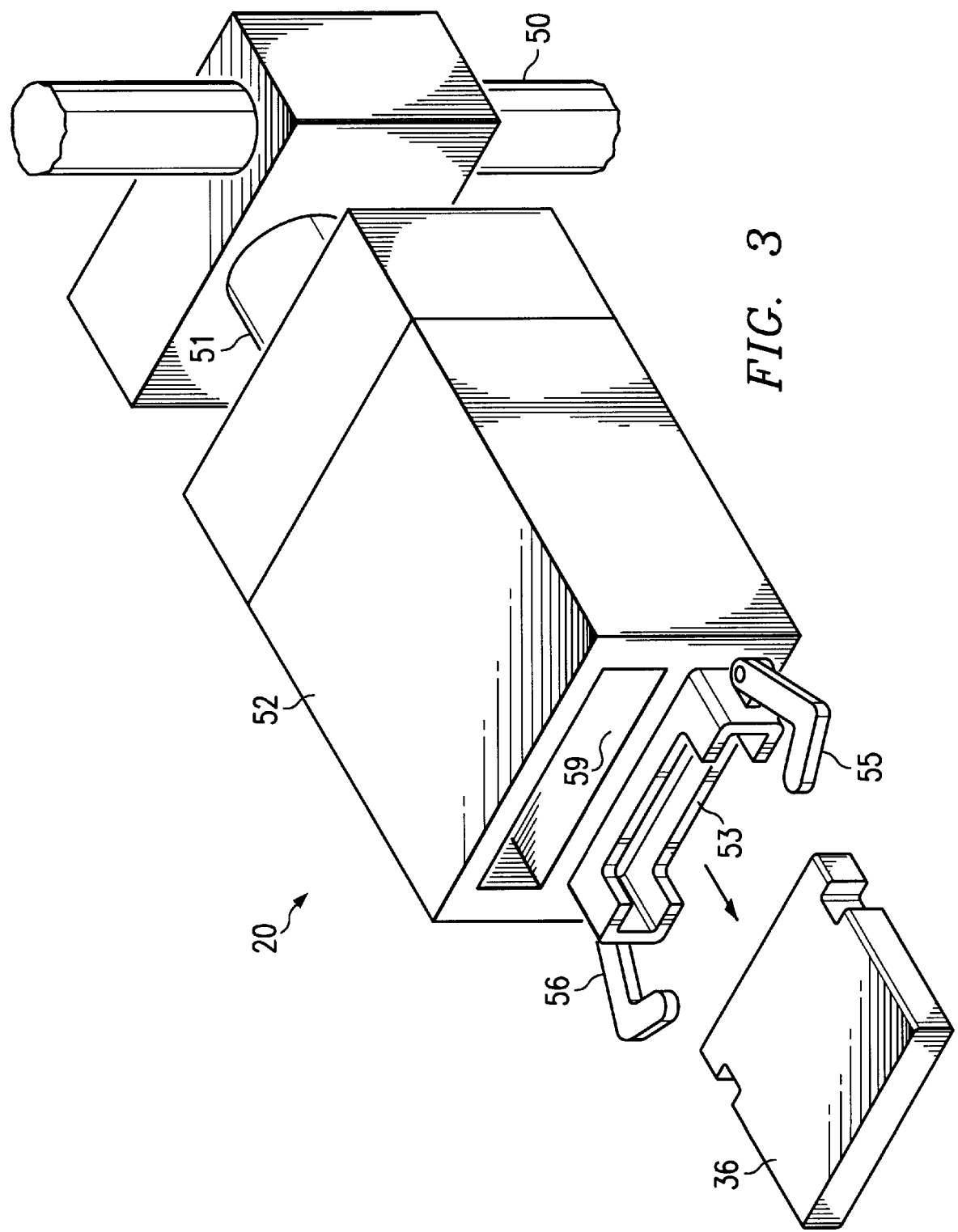
FIG. 3 is a perspective representation of a picker having one gripper employed in the libraries of FIG. 1.

Referring to FIGS. 1 and 2, first and second automated data storage libraries 10 and 11, respectively, each store a plurality of data storage media in a plurality of storage slots.

Typically, the data storage media are self-contained within a portable container, or cartridge. Examples of such data storage media include magnetic tape cartridges or cassettes, optical disk cartridges of various types, including ROM, WORM and rewritable, and in various formats. For universal reference to any of these types of media, the terms "data storage media" or "media" are used herein.

The storage slots are typically arranged in rows, and the rows are arranged in columns. Sets of columns 12–14 and 15–17, respectively, are illustrated in FIGS. 2A–2C.

Each of the libraries includes at least one picker 20 and 21, respectively. The picker is typically a robotic device which rotates about a pivot axis, or moves along a guideway in an X motion, and moves vertically in a Y motion, to access the various storage slots 12–14 and 15–17. The pickers 20 and 21 operate under the control of controller to fetch the data storage media from storage slots 12–14 and 15–17, and supply them to any of read/write stations, or data storage drives, and to store the data storage media in the storage slots.

An example of an automated data storage library is the Magstar MP (Multi-Purpose) 3575 Tape Library Dataserver from IBM.

In accordance with the present invention, a pass through and load/unload system 25 is provided for transferring data storage media between libraries 10 and 11 and for providing load/unload capability for the libraries 10 and 11.

As will be explained in greater detail hereinafter, the pass through and load/unload system 25 includes a pivoting robot 26 which rotates a housing 30 between portal 32 opening into library 10, portal 33 opening into library 20 and a bulk load/unload location 34. An actuator (not shown) extends and withdraws the housing 30. Thus, when the housing 30 is positioned at one of the portals 32 or 33, the actuator extends the housing into the library so that the picker 20 or 21 of the respective library 10 or 11 may fetch the data storage media 36 from magazines 37 in the housing and deliver the data storage media to the storage slots 12–14 or 15–17, and/or load data storage media into the magazines.

When the pivoting robot 26 moves the housing 30 to the bulk load/unload location 34, a door 38 may be unlocked to allow an operator to reach into the pass through and load/unload system 25 to unload and/or load magazines 37 out of or into the housing. Thus, a library (or an operator) may operate its picker to load one or more of the magazines 37 with data storage media to be unloaded from the library (e.g., as shown in FIG. 2A), and indicate that the load/unload is completed at the library, so that the actuator withdraws the housing from the portal towards the pivot axis, and a "bulk load/unload" command may be issued. The pivot robot 26 will rotate the housing to the bulk load/unload position at the bulk load/unload location 34 and will unlock the door 38, thereby allowing an operator to unload the magazines (e.g., as illustrated in FIG. 2B). The operator may request that the actuator extend towards the door 38 to facilitate unloading the data storage media from the housing. Thus, the unloading of the library is accomplished rapidly.

Similarly, a load operation may be initiated (by means of a "bulk load/unload" command) by one of the libraries, or by an operator at operator panel 40, unlocking the door 38 when the housing 30 is in the bulk load/unload position. The operator may then load magazines which have the desired data storage media therein into the housing 30. (The operator may first unload the magazines in the housing before loading the new magazines.) The operator will then close the door 38, and the door is locked. A "library load/unload" operation is then conducted, rotating the housing and extending it into the portal 32 or 33 of the library 10 or 11 which is to be loaded. The library picker 20 or 21 may then fetch the data storage media from the housing 30 and load the data storage media into the storage slots 12–14 or 15–17.

Data storage media may also be passed through from one library to the other, for example, if the job load of the two libraries needs to be balanced. As shown in FIG. 2A, library 10 may conduct a "library load/unload" operation. Thus, when the pivot robot 26 positions the housing 30 the portal 32, the actuator extends the housing into the library so that the picker may fetch the data storage media to be transferred to the other library from the storage slots 12–14 and deliver the data storage media to the magazines in the housing.

The library may then indicate that the "library load/unload" is "completed" at library 10, and the actuator will withdraw the housing from the portal 32. A request is then made that a "library load/unload" operation be conducted for library 11. Pivot robot 26 moves the housing to portal 33 of library 11, and the actuator extends the housing 30 through the portal and into the library. Picker 21 may then fetch the data storage media from the magazines in the housing and deliver the data storage media to the storage slots 15–17, thereby completing the transfer of the data storage media from library 10 to library 11 quickly.

Referring to FIG. 3, an example of a conventional picker 20 is illustrated for an automated data storage library. The picker rotates about and moves vertically along a vertical guide rail 50. A flip gear 51 supports a gripper housing 52 and gripper 53. The gripper includes fingers 55 and 56 which engage a data storage medium 36. To fetch a data storage medium, the gripper extends from the gripper housing and the fingers engage the storage medium. Then, the gripper 53 retracts back into the gripper housing 52 with the data storage medium. The flip gear 51 may turn the gripper over and back, which is important for a two sided data storage medium, such as an optical disk, so that ID the data storage medium may be delivered to a read/write station or data storage drive in the proper orientation. A second gripper may be provided at opening 59 in the gripper housing 52.

Figure 4:
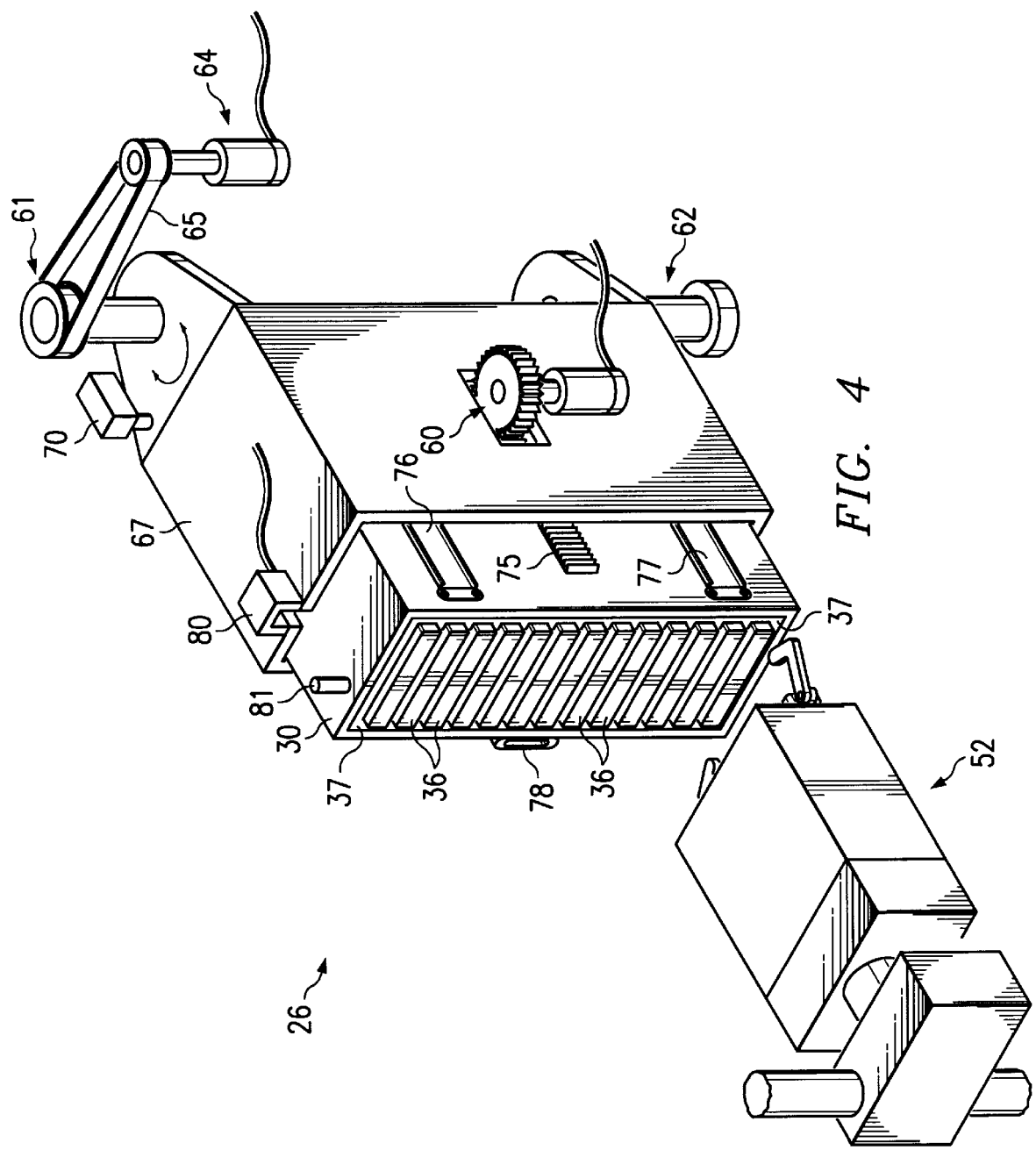
FIG. 4 is a perspective representation of the pass through and load/unload system of FIG. 1.

FIG. 4 illustrates an embodiment of the pivot robot 26 and an actuator 60 for positioning and extending and withdrawing housing 30 with respect to pivot axis 61 and 62. In the illustrated embodiment, a pivot motor and encoder 64 (which may comprise a servo motor) engage a belt 65 for rotating a receptacle 67 about the pivot axis 61 and 62. Alternatively, gears, pinch rollers or other suitable means may be utilized for rotating the receptacle 67. The encoder provides position information so that the motor imparts the correct motion to the receptacle 67. A position sensor 70 is provided on the receptacle 67 for reading an indicator (such as a bar code) at each of the three positions of FIGS. 2A–2C to provide the precise positioning information before the housing 30 may be extended.

The actuator motor 60 engages a track 75 to move the housing 30 on slides 76–78 to extend the housing with respect to the pivot axis 61 and 62, or to withdraw the housing back toward the pivot axis 61 and 62 and into receptacle 67. A horizontal position sensor 80 senses identifier 81 when the housing 30 is fully retracted into the receptacle 67. Alternatively, the horizontal position sensor 80 may detect other identifiers on the top of housing 30 to detect both when the housing 30 is fully extended and when it is fully retracted. Identifier 81 may also comprise a stop to insure that the housing is retracted only the correct distance into the receptacle. A gripper housing 52 is also illustrated and the gripper may fetch the data storage media 36 from the magazines 37, when the housing 30 is fully extended into the library of the gripper.

Figure 5:
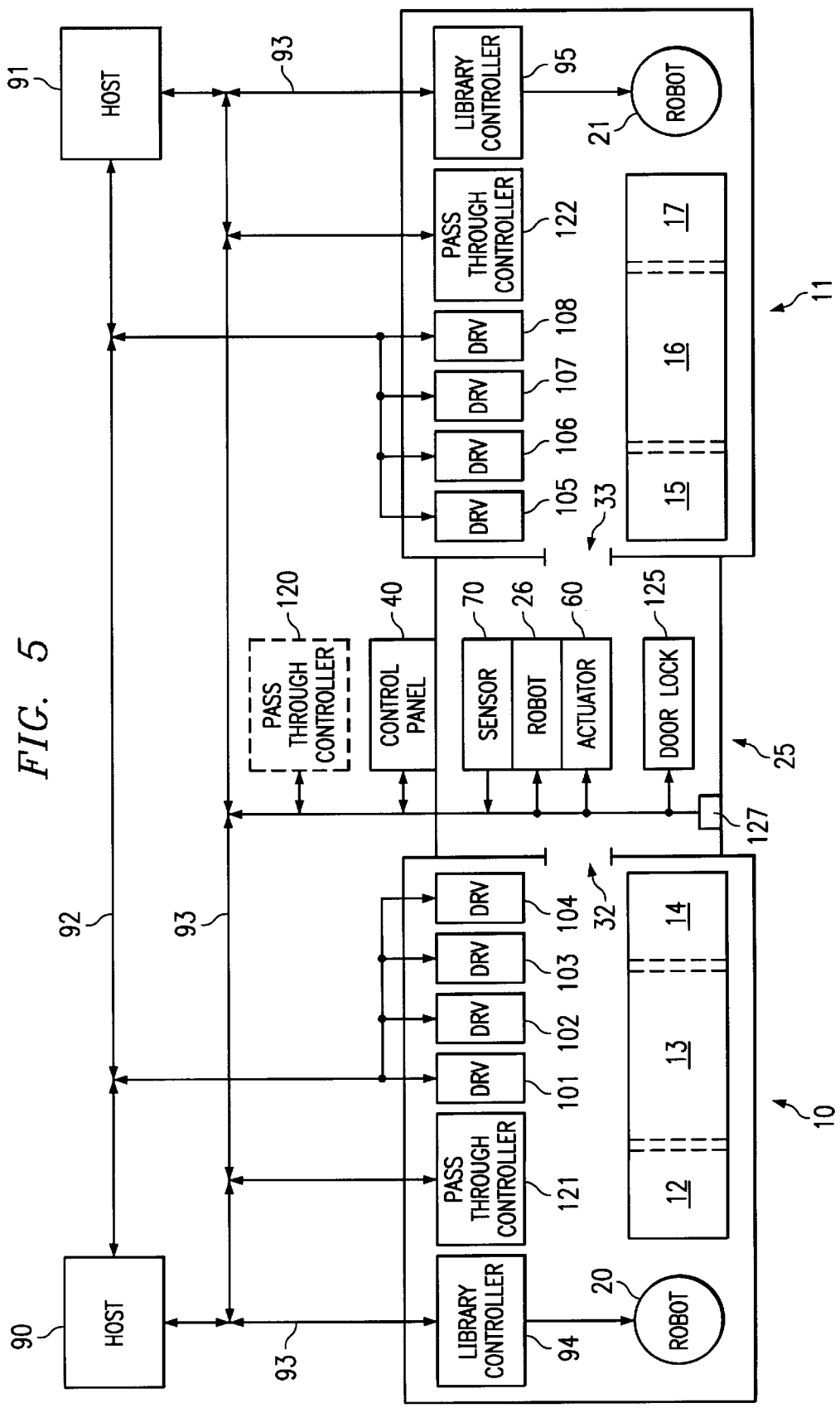
FIG. 5 is a block diagram of the system of FIG. 1 and attached host computer systems.

Referring to FIG. 5, the automated data storage libraries 10 and 11, and the pass through and bulk load/unload system 25 are illustrated in block diagram form. The libraries are shown connected to two host data processing systems 90 and 91 over busses 92 and 93. For example, the hosts may comprise AS/400 or RISC SYSTEM 6000 data processors supplied by IBM. The busses 92 and 93 may comprise any suitable bus communication path or paths between the host data processing systems 90 and 91 and the automated data storage libraries 10 and 11. One example comprises the small computer systems interface (SCSI) which is defined by various standards and is well known in the industry.

The pickers 20 and 21 operate under the control of a respective library controller 94 and 95 to fetch the data storage media from storage slots 12–14 or 15–17 and supply them to any of read/write stations, or data storage drives 101–104 or 105–108, respectively. In the illustrated embodiment, host processors 90 and 91 are directly connected to drives 101–104 and to drives 105–108. This allows maximum data transfer rates between drives and associated hosts. The host processors issue commands to the drives to search for, and to read and/or write data on the data storage media, and supply or receive the data with respect to the associated drive, all over bus 92.

The hosts 90 and 91 are connected to the library controllers 94 and 95 over bus 93. A host may request that a certain data storage medium be delivered to a drive, and the library controller will determine the storage slot storing the data storage medium and will direct the picker desired storage slot to fetch the data storage medium and deliver it to a desired drive.

In accordance with the present invention, in one embodiment, the pass through and load/unload system 25 includes a pass through controller 120, which may be internal to, or external of the pass through and load/unload system cabinet, to operate the pivoting robot 26 and actuator 60. Pass through controller 120 operates the robot 26 and actuator 60 in response to commands or signals from the library controllers 94 and 95 and/or from control panel 40, as described with respect to FIGS. 2A–2C. Hereinafter, "command" means a predetermined signal pattern. The pass through controller 120 comprises a computer processor, such as the PS/2 processor from IBM.

Alternatively, a pass through controller may be provided in either or both of the libraries. For example, a pass through controller 121 may be provided in library 10 and/or a pass through controller 122 may be provided in library 11. In practice, the pass through controllers may comprise program code implemented in the computer processor employed for the library controller 94 or 95, respectively. The connection to the bus 93 illustrated for pass through controller 121 or 122 thereby comprises the connection from the library controller 94 or 95.

The pass through controller 120, 121 or 122 responds to a "library load/unload" command for one of the libraries 10 or 11 to operate the pivoting robot 26 to position the housing at the portal 32 or 33 of the library and operate the actuator 60 to extend the housing away from the pivot axis into the portal, whereby the picker 20 or 21 of the library may load and/or unload the data storage media into or out of the removable magazine(s) in the housing. The pass through controller will sense the position sensor 70 which is coupled to the pass through controller, for indicating that the pivoting robot is properly positioned at the portal position for the library, and will only then operate the actuator 60 to extend the housing into the library. The "library load/unload" command may be initiated by the library controller 94 or 95 of the library 10 or 11, in its programming or by an operator, or may be initiated by an operator at the control panel 40. The pass through controller 120, 121 or 122 responds to a "library load/unload completed" command for the library 10 or 11 to operate the actuator 60 to withdraw the housing out of the portal 32 or 33 toward the pivot axis.

Referring additionally to FIG. 1, the pass through controller additionally responds to a "bulk load/unload command" to operate the pivoting robot 26 to position the housing 30 at the bulk load/unload position, which position is sensed by sensor 70, and to operate a door lock 125 to unlock the door 38. An operator may then remove and replace the magazine(s) 37 from the housing 30 and/or the data storage media 36, preferably in bulk in the magazines. The operator may remove or insert individual data storage media in the magazines if desired. Upon completion of the bulk load/unload by the operator, the operator will close the door 38. A door sensor 127, such as a magnetic sensor, indicates that the lockable door has been closed, and provides the indication to the pass through controller, and the pass through controller responds to the door sensor to operate lock 125 to lock the door.

The pass through and bulk load/unload system 25 may also pass data storage media from one of the libraries to the other of the libraries. The passing of the data storage media may be initiated by one of the library controllers 94 or 95 of the library 10 or 11, in its programming or by an operator, or may be initiated by an operator at the control panel 40. Referring additionally to FIGS. 2A and 2C, the pass through controller 120, 121 or 122 responds to a "library load/unload" command for one of the libraries to operate the pivoting robot 26 to position the housing 30 at the portal 32 or 33 of the one library and, if sensor 70 indicates that the housing is properly positioned, to operate the actuator 60 to extend the housing away from the pivot axis into the portal. The picker 20 or 21 of the one library may load the data storage media 36 into the removable magazine(s) 37 in the housing. The pass through controller responds to a "library load/unload completed" command for the one library to operate the actuator 60 to withdraw the housing out of the portal 32 or 33 toward the pivot axis and to operate the pivoting robot 26 to position the housing at the portal 33 or 32 of the other library. If the sensor 70 indicates that the housing is properly positioned, the pass through controller operates the actuator 60 to extend the housing 30 away from the pivot axis into the portal of the other library. The picker 21 or 20 of the other library may unload the data storage media 36 from the removable magazine(s) 37 in the housing. The other library may also load other data storage media into the removable magazine(s) if desired. The library controller then responds to a "library load/unload completed" command for the other library to operate the actuator 60 to withdraw the housing 30 out of the portal toward the pivot axis, thereby completing the transfer of the data storage media from the one library to the other library.

Alternatively, if both pass through controllers 121 and 122 are provided, control of the pass through and bulk load/unload operations may also be transferred from one library to the other.

In the case of the bulk load/unload operation, the pass through controller 121 or 122 of the library into or out of which the bulk load and/or unload is to occur will control the full operation as described above.

In the operation for passing data storage media from one of the libraries to the other of the libraries, the pass through controller 121 or 122 for the one library responds to a "library load/unload" command for the one library to operate the pivoting robot 26 to position the housing 30 at the portal 32 or 33 of the one library, and, if sensor 70 indicates that the housing is properly positioned, operates the actuator 60 to extend the housing away from the pivot axis into the portal. The picker 20 or 21 of the one library may then load the data storage media 36 to be transferred into the removable magazine(s) in the housing, under the control of the one library controller 94 or 95. The pass through controller 121 or 122 of the one library then responds to a "library load/unload completed" command from the library controller of the one library to operate the actuator 60 to withdraw the housing out of the portal toward the pivot axis. The pass through controller 121 or 122 of the one library then turns control over to the pass through controller 122 or 121 of the other library 11 or 10. The pass through controller 122 or 121 of the other library responds to a "library load/unload" command for the other library (the pass through controller 122 or 121 may generate this command internally) to operate the pivoting robot 26 to position the housing 30 at the portal 33 or 32 of the other library. Upon the sensor 70 indicating that the housing is properly positioned, the pass through controller 122 or 121 of the other library operates the actuator 60 to extend the housing 30 away from the pivot axis into the portal 33 or 32 of the other library. The picker 21 or 20 of the other library may then unload the data storage media from the removable magazine in the housing. If desired, the picker may also load other data storage media into the removable magazine(s). The pass through controller of the other library then responds to a "library load/unload completed" command for the other library to operate the actuator 60 to withdraw the housing out of the portal toward the pivot axis, thereby completing the transfer.

Other configurations of the pass through controllers 120, 121 and/or 122 can be envisioned by those of skill in the art, and other alternatives to the sensors, lock, robots and actuators can also be envisioned.

While the preferred embodiments of the present invention have been illustrated in detail, it should be apparent that modifications and adaptations to those embodiments may occur to one skilled in the art without departing from the scope of the present invention as set forth in the following claims.

We claim:

1. A pass through system for transporting data storage media between two automated data storage libraries and for bulk loading data storage media into or out of said libraries, each of said libraries having at least one picker with at least one gripper, comprising:

a first portal opening into a first one of said libraries;

a second portal opening into a second one of said libraries;

a housing capable of supporting at least one removable magazine, each said removable magazine for holding a plurality of said data storage media;

a pivoting robot supporting said at least one housing, said pivoting robot rotating about a pivot axis between a first position directed at said first portal, a second position directed at said second portal, and a bulk load/unload position between said first and said second positions;

an actuator supported by said pivoting robot, said actuator withdrawing said housing toward said pivot axis and extending said housing away from said pivot axis; and a pass through controller operating said pivoting robot and said actuator, said pass through controller responding to a "library load/unload" command for one of said libraries to operate said pivoting robot to position said housing at said portal of said one library and operating said actuator to extend said housing away from said pivot axis into said portal, whereby said picker of said one library may load and/or unload said data storage media into or out of said at least one removable magazine in said housing, said pass through controller responding to a "library load/unload completed" command for said one library to operate said actuator to withdraw said housing out of said portal toward said pivot axis.

2. The pass through system of claim 1, additionally comprising a lockable door at said bulk load/unload position of said housing, and wherein said pass through controller additionally responds to a "bulk load/unload command" to operate said pivoting robot to position said housing at said bulk load/unload position, and to unlock said door, whereby an operator may remove and replace said at least one removable magazine from said housing and/or said data storage media therefrom.

3. The pass through system of claim 2, additionally comprising a door sensor indicating that said lockable door has been closed, so that an operator upon completing a bulk load/unload may close said lockable door, said pass through controller responding to said door sensor to lock said lockable door.

4. The pass through system of claim 1, additionally comprising a position sensor coupled to said pass through controller, for indicating that said pivoting robot is properly positioned at each of said positions, said pass through controller operating said actuator to extend said housing only if said sensor indicates said pivot robot is correctly positioned at the position indicated by the command responded to by said pass through controller.

5. The pass through system of claim 1, for passing data storage media from one of said libraries to the other of said libraries, said pass through controller responding to a "library load/unload" command for one of said libraries to operate said pivoting robot to position said housing at said portal of said one library and operating said actuator to extend said housing away from said pivot axis into said portal, whereby said picker of said one library may load said data storage media into said at least one removable magazine in said housing, said pass through controller responding to a "library load/unload completed" command for said one library to operate said actuator to withdraw said housing out of said portal toward said pivot axis and to operate said pivoting robot to position said housing at said portal of said other library and operating said actuator to extend said housing away from said pivot axis into said portal of said other library, whereby said picker of said other library may unload said data storage media of said at least one removable magazine in said housing and may load other said data storage media into said at least one removable magazine, and said pass through controller responding to a "library load/unload completed" command for said other library to operate said actuator to withdraw said housing out of said portal toward said pivot axis.

6. An automated data storage system, comprising:

a first automated data storage library, said library having at least one picker with at least one gripper and having a library controller for operating said at least one picker;

a second automated data storage library, said library having at least one picker with at least one gripper and having a library controller for operating said at least one picker;

a first portal opening into said first automated data storage library;

a second portal opening into said second automated data storage library; and a pass through system located between said first portal and said second portal for transporting data storage media between said first and said second automated data storage libraries and for bulk loading data storage media into or out of said libraries, said pass through system including:

a housing capable of supporting at least one removable magazine, each said removable magazine for holding a plurality of said data storage media;

a pivoting robot supporting said at least one housing, said pivoting robot rotating about a pivot axis between a first position directed at said first portal, a second position directed at said second portal, and a bulk load/unload position between said first and said second positions;

an actuator supported by said pivoting robot, said actuator withdrawing said housing toward said pivot axis and extending said housing away from said pivot axis; and a pass through controller operating said pivoting robot and said actuator, said pass through controller responding to a "library load/unload" command for one of said libraries to operate said pivoting robot to position said housing at said portal of said one library and operating said actuator to extend said housing away from said pivot axis into said portal, whereby said picker of said one library may load and/or unload said data storage media into or out of said at least one removable magazine in said housing under the control of said one library controller, said pass through controller responding to a "library load/unload completed" command from said one library controller to operate said actuator to withdraw said housing out of said portal toward said pivot axis.

7. The automated data storage system of claim 6, comprising a pass through controller for each of said automated data storage libraries, said one library pass through controller operating said pivoting robot and said actuator for "library load/unload" commands for said one library, said one library relinquishing control of said pivoting robot and said actuator upon a "library load/unload completed" command from said one library and upon the occurrence of a "library load/unload" command for the other of said libraries.

8. The automated data storage system of claim 7, additionally comprising a lockable door at said bulk load/unload position of said pass through system housing, and wherein said pass through controller of one of said libraries additionally responds to a "bulk load/unload command" for said one library to operate said pivoting robot to position said housing at said bulk load/unload position, and to unlock said door, whereby an operator may remove and replace said at least one removable magazine from said housing and/or said data storage media therefrom, and, said pass through controller, before positioning said housing at said bulk load/unload position for a bulk unload operation, or subsequent to positioning said housing at said bulk load/unload position for a bulk load operation, to operate said pivoting robot to position said housing at said portal of said one library and operating said actuator to extend said housing away from said pivot axis into said portal, whereby said picker of said one library may load and/or unload said data storage media into or out of said at least one removable magazine in said housing under the control of said library controller of said one library.

9. The automated data storage system of claim 8, additionally comprising a door sensor indicating that said lockable door has been closed, so that an operator upon completing a bulk load/unload may close said lockable door, said pass through controller of said one library responding to said door sensor to lock said lockable door.

10. The automated data storage system of claim 7, additionally comprising a position sensor coupled to said pass through controllers, for indicating that said pivoting robot is properly positioned at each of said positions, said pass through controller for said one library operating said actuator to extend said housing only if said sensor indicates said pivot robot is correctly positioned at the position indicated by the command responded to by said pass through controller.

11. The automated data storage system of claim 7, for passing data storage media from one of said libraries to the other of said libraries, said pass through controller for said one library responding to a "library load/unload" command for said one library to operate said pivoting robot to position said housing at said portal of said one library and operating said actuator to extend said housing away from said pivot axis into said portal, whereby said picker of said one library may load said data storage media into said at least one removable magazine in said housing under the control of said one library controller;

said pass through controller of said one library responding to a "library load/unload completed" command from said library controller of said one library to operate said actuator to withdraw said housing out of said portal toward said pivot axis and to turn control over to said pass through controller of said other library;

said pass through controller of said other library responding to a "library load/unload" command for said other library to operate said pivoting robot to position said housing at said portal of said other library and to operate said actuator to extend said housing away from said pivot axis into said portal of said other library, whereby said picker of said other library may unload said data storage media of said at least one removable magazine in said housing and may load other said data storage media into said at least one removable magazine; and said pass through controller of said other library responding to a "library load/unload completed" command for said other library to operate said actuator to withdraw said housing out of said portal toward said pivot axis.

* * * * *